United States Patent [19]

Swenson

[11] 3,858,498
[45] Jan. 7, 1975

[54] DISPENSING FREEZER
[75] Inventor: Harvey F. Swenson, Seattle, Wash.
[73] Assignee: Sweden Freezer Manufacturing Company, West Seattle, Wash.
[22] Filed: May 22, 1973
[21] Appl. No.: 362,931

[52] U.S. Cl.................................... 99/470, 62/342
[51] Int. Cl............................................... A23c 3/04
[58] Field of Search ............ 99/470, 453, 455, 467, 99/473, 474, 475, 476; 165/65; 62/342, 322

[56] References Cited
UNITED STATES PATENTS
3,222,035  12/1965  Lutz...................................... 62/342

Primary Examiner—Robert W. Jenkins
Attorney, Agent, or Firm—Seed, Berry, Vernon & Baynham

[57] ABSTRACT

A dispensing freezer is divided into a heated zone and a cooled zone. Dry and liquid ingredients are proportionately mixed in the heated zone and allowed to free-fall through a transition zone into the cooled zone. The temperatures in the heated and cooled zones are such that bacteria growth is inhibited and no product touches the surfaces in the transition zone where bacteria growth can more readily occur. The cooling zone has a freezing chamber and a reservoir. A float operated switch senses the level of the liquid in the reservoir and controls the dispensing and mixing of fresh ingredients.

8 Claims, 2 Drawing Figures

Patented Jan. 7, 1975 3,858,498

DISPENSING FREEZER

BACKGROUND OF THE INVENTION

1. Field of the Invention

This invention pertains to feeding mix to freezers which operate to produce and dispense chilled or partially frozen food products such as milk shake mix or soft ice cream.

2. Description of the Prior Art

In conventional wet mix soft ice cream or milk shake machines a liquid mix reserve is provided for replenishing the finished product as it is drawn from the machine. Sanitaton requirements are met by refrigerating the liquid reserve below a temperature of 45° F. The liquid mix reservoir stores enough mix for several hours of machine use and has heretofore been isolated from the freezing chamber and located generally above it.

In other food product machines, such as hot beverage dispensers, dry mix is reconstituted just prior to delivery and offers substantial benefits in handling and sanitation. Although the hot beverage dispensers are available presently for reconstituting dry mix, such as cocoa, heretofore no satisfactory machine has been available for reconstituting dry mix in a chilled or partially frozen product dispenser. It is apparent that several problems are presented when reconstituting dry mix for a frozen or chilled product rather than a hot beverage. For example, a dry mix ingredient generally will not reconstitute well at temperatures below those which inhibit bacteria growth i.e., 45° F. Secondly, excessive energy may be required to heat and then cool the liquid product. Thirdly the product must pass between heated and cooled zones where it may contact surfaces that are at temperatures at which bacteria growth is enhanced.

SUMMARY OF THE INVENTION

It should be understood that the principles of the invention apply to all chilled reconstituted products, including chilled liquids or partially frozen products. Therefore freezer chamber and like terms are used only for brevity but not to limit the invention. It is therefore an object of this invention to provide a freezer dispenser with a liquid reservoir immediately axially behind the freezing chamber.

It is another object of this invention to provide a freezer dispenser which mixes and dispenses dry and liquid ingredients without substantially contaminating the surfaces in the freezer dispenser.

It is another object of this invention to provide a freezer dispenser which has a long operating span before the necessity of cleaning to remove bacteria contaminated food product.

It is another object to provide an improved, economical freezer dispenser. Basically, the first object is obtained by providing a small reservoir directly axially behind the auger in the freezing chamber. A baffle plate separates the reservoir from the freezing chamber and a float is positioned in the reservoir to control a switch which controls feeding and mixing means to add more liquid mix in the reservoir. A primary purpose of the reservoir is to provide a liquid state to operate a float controlled switch for signaling the need for replenishment of the dispensed product. It should be understood however that this is a unique preferred technique but other controls are possible and the mixed ingredients could also be dispensed directly into the freezing cylinder. The baffle plate serves to isolate the reservoir from the freezing chamber to reduce interference with the float.

The remaining objects are obtained by keeping the liquid reconstituted product either above about 140° F or below about 45° F, the temperatures, accepted by public health authorities as being suitable for long term storage at which bacteria growth is inhibited. Intermediate storage of a large quantity of liquid mix is eliminated by reconstituting proportionate amounts of dry powder mix and tap water and dispensing it directly into the freezing cylinder or into a small reservoir behind the freezing cylinder. Reconstitution occurs as demands are made for replenishment of product in the freezing chamber by serving the finished product. The dry mix and tap water outlets are located in a heated zone maintained at a temperature of 140°F or higher but need not be. The freezing cylinder or the freezing cylinder and reservoir, if a reservoir is used, is in a cooled zone having a temperature of about 45°F or lower. The freezing cylinder, of course, may be at a lower temperature to promote freezing of the product if desired. A transition zone is provided between the heating zone and the cooled zone to allow transfer of the reconstituted product from the heated zone into the cooled zone without the product contacting surfaces at temperatures which will support bacteria growth. In the preferred embodiment this is uniquely provided by allowing the reconstituted product to free-fall through the transition zone.

In this manner, down time for cleaning the equipment is minimized, easily allowing continuous use for 30 days and possibly as long as 72 days if the zones are kept above about 140° F or below 45° F. The dry mix being in the heated zone is kept dry and free from clumping. Dispensing and mixing of the tap water in the heated zone also facilitates reconstitution of the product which generally does not reconstitute freely at a temperature below 45° F. Actually, however, only the actual mixing need take place in a heated zone. Furthermore, mixing small quantities in the heated zone and transferring them into a much greater volume (4 or 5 times greater) of cooled product facilitates rapid cooling of the reconstituted product and thus reduces the temperature of the mix almost instantaneously to a temperature at which bacteria growth is inhibited. Rerun product, that is excess unused product, is reduced substantially to that remaining in the reservoir and freezing cylinder at each shutdown.

DETAILED DESCRIPTION OF THE PREFERRED EMBODIMENTS

Figure 1:
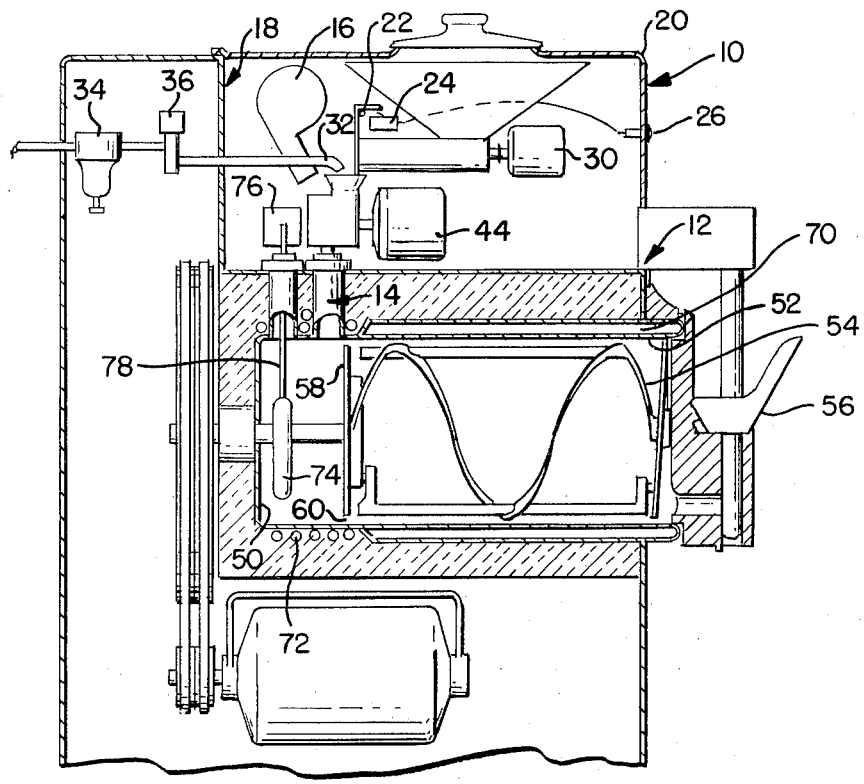
FIG. 1 is a fragmentary vertical section of a typical freezer dispenser embodying the principles of the invention.

The freezer dispenser has a heated zone 10, a cooled zone 12 and a transition zone 14 between the heated and cooled zones. In the heated zone, the temperature is maintained above about 140° F by a heater-blower 16. The heated zone includes a compartment 18 having removable lid 20. A dry mix hopper 21 is positioned in the compartment 18 and has a see-through lid 24 for viewing the level of dry mix in the hopper.

Dry mix is dispensed by an auger screw 28 that is rotated by a precision electric motor 30 such that an accurate metered amount of dry mix is dispensed. In the preferred embodiment a leaf sensor 23 is mounted for movement about a fulcrum 22. The sensor is swung clockwise by the dispensed dry mix. If no mix is present in the hopper, the leaf is not moved and allows a switch 24 to stop further dispensing of water and to energize an "empty" light 26. Tap water at about 60° F or higher is introduced through a spout 32. A pressure regulator 34 is provided in the incoming water line to maintain the water pressure to the tap at a constant pressure to allow accurate metering of the flow for accurate flow control of the volume of water introduced. A solenoid operated valve 36 releases the water through the spout in synchronism with energization of the motor 30 so that the correct proportion of liquid is added to the dry mix.

Figure 2:
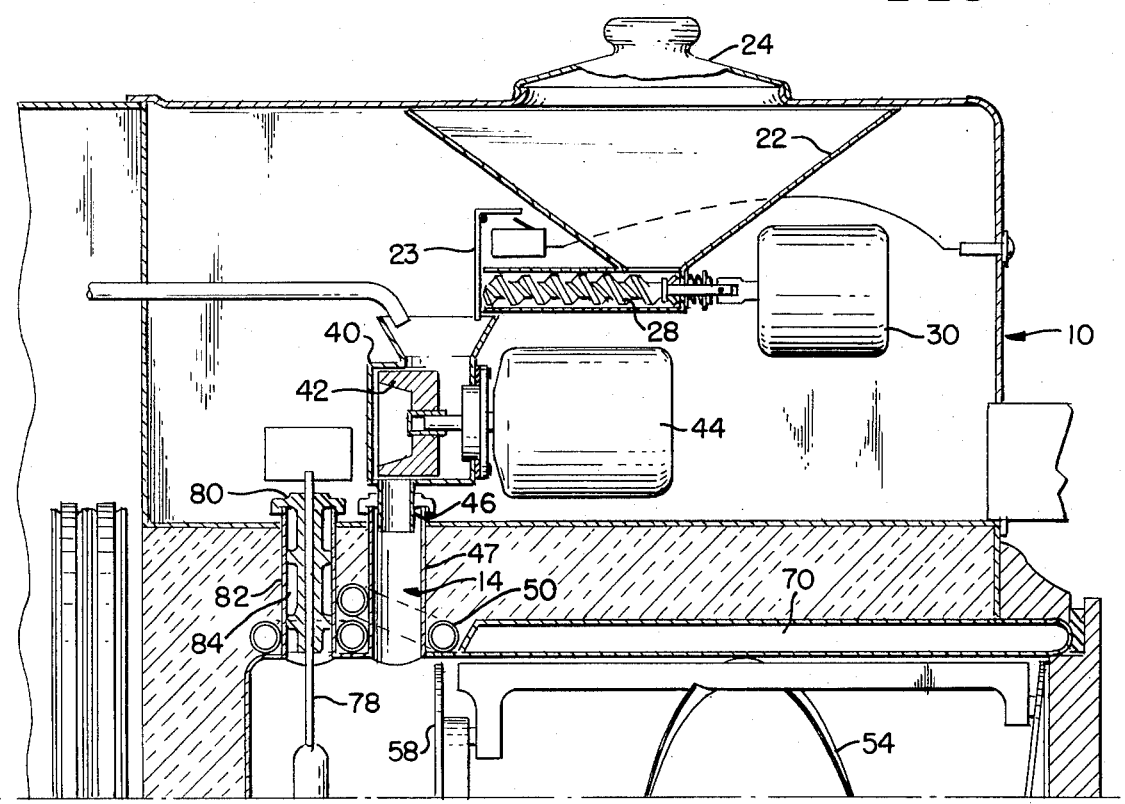
FIG. 2 is an enlarged fragmentary vertical section of the freezer dispenser shown in FIG. 1.

The water and dry mix are reconstituted or mixed in a mixing chamber 40 also located in the heated zone 10. The high temperature in the heated zone improves the mixing. Mixing is accomplished by a mixing vane 42 powered by an electric motor 44. Conventional mixing apparatus can be employed to agitate the water throughout the product and provide self-rinsing of the mixing area. Conventional hot beverages dispensers have suitable mixing arrangements for this purpose. The mixed product leaves the mixing chamber 40 through a nozzle 46. The nozzle 46 terminates within a tube 47 which in the preferred embodiment forms the transition zone 14 between the heated and the cooled zone. The tube terminates well within the 140° heated zone and is large enough in diamter to avoid product contacting its surfaces. As is best shown in FIG. 2, the product can free-fall through the tube 47 and not touch any of the surfaces of the tube. The transition zone is in a temperature range in which bacteria growth is not inhibited but still does not cause contamination since no product that will support bacteria growth collects in the zone.

The reconstituted product falls into the cooled zone and into a reservoir 50. If desired, the product could be fed directly into the rear of freezing cylinder 52 rather than first into a reservoir. The use of the reservoir provides better control of the quantity of product available in the freezing cylinder. In the freezing cylinder a conventional dasher or auger 54 is employed with a conventional dispensing control 56. Suitable augers and dispensing controls are shown in U.S. Pat. Nos. 2,924,951 and 2,746,730, for example. The conventional auger is modified to the extent, however, that a vertical baffle plate 58 is added to form a portion of the reservoir. The space 60 allows liquid to flow into the cylinder. The baffle plate isolates the liquid in the reservoir 50 from the product in the freezing chamber 52, reducing interference with the float action control as will be described. A cooling jacket 70 maintains the freezing cylinder at the temperature desired i.e., 28° F, whereas cooling coils 72 maintain the reservoir at about 35° to 45° F.

An advantage of the reservoir 50 is that it provides for an accurate control of the reconstituted product made available to the freezing chamber 52. For this purpose a float 74 is provided in the reservoir and is connected to a switch 76 by a switch actuator arm 78. The baffle plate prevents congealed product from moving rearwardly into the reservoir to obstruct movement of the float. The switch controls the motor 30 and the solenoid switch 36 as well as the motor 44 to provide more reconstituted mix to the reservoir. Thus as the product is drawn from the front of the freezing cylinder 52, liquid product will feed into the freezing cylinder from the rear via the passage 60, at a controlled rate no greater than what the freezing cylinder can freeze, regardless of the draw rate from the machine. This allows the float to drop actuating the mix reconstituting device to supplement the product drawn from the freezing cylinder.

In a typical example a production rate of somewhere between 15 and 20 gallons per hour of finished milk shakes may be expected. This is approximately 120 of the usual large 16 ounce volume milk shake containers per hour.

The switch actuating rod 78 and the transition tube 47 are of low heat transfer material such as plastic. Likewise a guide 80 for guiding the actuating rod is housed in a sleeve 82 both of which are of low heat transfer material with air spaces 84 being provided along the guide 80 to insolate the cooled zone from the heated zone.

In operation, a reduction in the level of liquid in the reservoir 50 will lower the floate 74 thus actuating the switch 76. Actuation of the switch 76 will energize the solenoid 36 and the motors 30 and 44. Dry mix and water will then be mixed in the mixing chamber 40 and will free-fall through the transition tube 47 into the reservoir raising the float 74 to deactuate the switch 76. Liquid reconstituted mix will then flow through the space 60 into the freezing cylinder and will be slowly moved through the freezing cylinder emerging through the dispensing end 56 as frozen or semi-frozen or merely chilled food product.

Any conventional timer may be employed to require shut down of the machine for cleaning at legally required intervals.

While the preferred form of the invention has been illustrated and described, it shall be understood that variations will be apparent to one skilled in the art without departing from the principles herein. Accordingly, the invention is not to be limited to the specific embodiment disclosed.

I claim:

1. Apparatus for making a chilled or partially frozen food product comprising a heated zone having a mixing area, a dry ingredient supply, a liquid ingredient supply, means for dispensing proportionate quantities of dry and liquid ingredients, means for mixing the ingredients in said mixing area in said heated zone, means for heating the heated zone to a temperature at which bacteria growth is inhibited, a cooled zone having a cooling chamber for cooling the mixed ingredients, means for cooling said cooled zone to a temperature at which bacteria growth is inhibited, means for dispensing the product from the cooling chamber, and connecting means between said mixing area and said cooling chamber for transferring the product from the heated mixing area to the cooled chamber said connecting means being of a size such that the product does not contact any part of the surfaces of said connecting means which will support bacteria growth.

2. The apparatus of claim 1 said product transferring means including a temperature transition zone, a vertical passage in said temperature transition zone open to both said cooled zone and said heated zone, and means for guiding said mixed product in a path through said passage without engaging the sides of said passage.

3. The apparatus of claim 2, said dry ingredient supply being within said heated zone to reduce clumping of the dry ingredient.

4. The apparatus of claim 2, said cooled zone including a cooled reservoir for cooling the mixed ingredients prior to delivery to said cooling chamber, and float-operated switch means for actuating said dry and liquid ingredient dispensing means when the level of mixed product in said reservoir is reduced.

5. The apparatus of claim 4 said switch means including a float, a switch contact in the heated zone, an elongated contact operating member interconnecting the switch contact with said float, and means for insulating the cooled end of said contact operating member from said heated zone.

6. The apparatus of claim 4, said cooled reservoir including a smooth baffle plate separating the liquid mixed ingredients from the product in the cooling chamber.

7. A freezing cylinder dispenser for chilled or partially frozen food product comprising means for mixing dry and liquid ingredients in a mixing area heated to a temperature at which bacteria growth is inhibited, a cooling chamber for cooling the mixed ingredients at a temperature at which bacteria growth is inhibited, and with connecting means between said mixing area and said cooling chamber for transferring the mixed ingredients from said mixing area to said cooling chamber said connecting means being of a size such that the product does not contact any surfaces at a temperature which will support bacteria growth.

8. The dispenser of claim 7 said temperatures of said heated mixing area and cooling chamber being 140° F or above and 45° F or below, respectively.

* * * * *